Patented July 30, 1929.

1,722,914

UNITED STATES PATENT OFFICE.

HEINRICH HEIMANN AND ALFONS BAYERL, OF DESSAU, GERMANY, ASSIGNORS TO I. G. FARBENINDUSTRIE AKTIENGESELLSCHAFT, OF FRANKFORT-ON-THE-MAIN, GERMANY.

MANUFACTURE OF CELLULOSE ESTERS.

No Drawing. Application filed December 11, 1926, Serial No. 154,300, and in Germany December 19, 1925.

The present invention relates to new cellulose compounds and to a process of preparing the same.

We have found that by treating cellulose with formic acid new cellulose compounds are obtained being valuable intermediate products in the manufacture of cellulose esters.

We prefer to subject cellulose to a treatment with a commercial formic acid of about 85% strength. The duration of the treatment as well as temperature employed may vary within certain limits. When working at a temperature of about 20° C., for instance, the reaction is preferably continued for about 24 hours. The excess of formic acid is separated by centrifuging or by another suitable method and thus recovered. After having been washed and dried the cellulose is esterified in known manner. The effect of preliminary treatment is no doubt a loosening of the fibres. Our experiments, however, have proved that esterification is effected to a certain degree and that the reaction product contains about 4 to 10% formic acid bound in the form of the formic acid ester of cellulose. Our new products have proved to be valuable intermediate products in the manufacture of cellulose esters. They possess a high reactivity. When they are subjected, for instance, to the usual acetylation process, acetylation is effected by means of a smaller quantity of acetic anhydride and in less time than was possible hitherto. During the reaction gas is developed in a lively manner while the temperature is increasing. The invention may be applied to pure cellulose, such as cotton or to any cell-substance free from lignin.

The following example illustrates the invention without limiting it to the parts being by weight:

*Example.*—1 part of cotton is introduced, while stirring, into 20 parts of commercial formic acid of 85 per cent strength and the stirring is continued for about 24 hours at about 20° C. The cotton is then centrifuged and the formic acid still remaining in the fibre is washed away. The cotton which has been pretreated in this manner and dried, may be esterified in the known manner, for example it may be acetylated. The formic acid is in greater part recovered in a concentrated form suitable for treating a fresh batch of material. The washings constitute a dilute formic acid which may be concentrated in known manner.

By raising the temperature the preliminary treatment of the cellulose can be considerably shortened.

What we claim is:

1. The process which comprises treating cellulose with formic acid of about 85% strength.

2. The process which comprises treating cotton with formic acid of about 85% strength.

3. The process which comprises treating cellulose with formic acid of about 85% strength for about 24 hours at a temperature of approximately 20° C.

4. The process which comprises treating cotton with formic acid of about 85% strength for about 24 hours at a temperature of approximately 20° C.

5. As new products the compounds obtainable by treating cellulose with formic acid of about 85% strength.

6. As new products the cellulose compounds containing about 4 to 10% formic acid bound in the form of the formic acid ester of cellulose and being substantially identical with the products obtainable by subjecting cellulose to a treatment with formic acid of about 85% strength for about 24 hours at a temperature of about 20° C.

In testimony whereof we have affixed our signatures.

HEINRICH HEIMANN.
ALFONS BAYERL.